(12) United States Patent
Strait

(10) Patent No.: US 6,438,186 B1
(45) Date of Patent: Aug. 20, 2002

(54) CARRIER PHASE DERIVED SYMBOL TIMING

(75) Inventor: Jeffrey C. Strait, Nevada City, CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/144,840

(22) Filed: Aug. 31, 1998

(51) Int. Cl.[7] .............................. H04L 7/00; H04L 27/28
(52) U.S. Cl. ....................... 375/354; 375/260; 375/326; 375/371
(58) Field of Search ................... 375/219, 222, 375/260, 316, 326, 354, 371, 372, 377; 455/59; 370/203, 204, 206, 210, 503, 516

(56) References Cited

U.S. PATENT DOCUMENTS 5,228,062 A * 7/1993 Bingham ................... 375/344
5,995,568 A * 11/1999 Molnar et al. .............. 375/354

* cited by examiner

*Primary Examiner*—Betsy L. Deppe
(74) *Attorney, Agent, or Firm*—McDonnell Boehnen Hulbert & Berghoff

(57) ABSTRACT

A method and apparatus for symbol timing initialization in a multi-carrier receiver. The method uses phase measurements from a plurality of the individual carriers to make an initial determination of the symbol boundary. The method measures the phases of two carriers, preferably the pilot carrier and one adjacent carrier, and, after compensating for phase distortion associated with modulation of data onto the carrier and phase distortion imposed on the carriers by the channel, determines the symbol timing based on the phase difference between the two carriers. Because a sampling offset results in a phase offset from bin to bin of a DFT, an examination of the extent of the phase offset between two known symbols yields the sampling offset, and thus the symbol frame index.

9 Claims, 2 Drawing Sheets

CARRIER PHASE DERIVED SYMBOL TIMING

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

A. Field of the Invention

The present invention relates to the synchronization of telecommunication devices. More particularly, the method of the present invention relates to modem synchronization. The method is readily applied to asymmetric digital subscriber line (ADSL) modems.

B. Description of the Related Art

Asymmetric Digital Subscriber Line (ADSL) is a communication system that operates over existing twisted-pair telephone lines between a central office and a residential or business location. It is generally a point-to-point connection between two dedicated devices. ADSL supports bit transmission rates of up to approximately 6 Mbps in the downstream direction (to a subscriber device at the home), but only 640 Kbps in the upstream direction (to the service provider/central office). ADSL connections actually have three separate information channels: two data channels and a POTS channel. The first data channel is a high-speed downstream channel used to convey information to the subscriber. Its data rate is adaptable and ranges from 1.5 to 6.1 Mbps. The second data channel is a medium speed duplex channel providing bi-directional communication between the subscriber and the service provider/central office. Its rate is also adaptable and the rates range from 16 to 640 kbps. The third information channel is a POTS (Plain Old Telephone Service) channel. The POTS channel is typically not processed directly by the ADSL modems—the POTS channel operates in the standard POTS frequency range and is processed by standard POTS devices after being split from the ADSL signal.

The American National Standards Institute (ANSI) Standard T1.413, the contents of which are incorporated herein by reference, specifies an ADSL standard that is widely followed in the telecommunications industry. The ADSL standard specifies a modulation technique known as Discrete Multi-Tone modulation.

Discrete Multi-Tone Modulation

Discrete Multi-Tone (DMT) uses a large number of subcarriers spaced close together. Each subcarrier is modulated during training using Quadrature Phase Shift Keying, or QPSK. During normal data transmission mode, the modulation used in ADSL is Multi-level Quadrature Amplitude Modulation (MQAM). The data bits are mapped to a series of symbols in the I-Q complex plane, and each symbol is used to modulate the amplitude and phase of one of the multiple tones, or carriers.

In some ADSL transceivers, the symbols are used to specify the magnitude and phase of a subcarrier, where each subcarrier frequency corresponds to the center frequency of the "bin" associated with a Discrete Fourier Transform (DFT). The modulated time-domain signal corresponding to all of the subcarriers can then be generated in parallel by the use of well-known DFT algorithm called Inverse Fast Fourier Transforms (IFFT).

The symbol period in ADSL modems is relatively long compared to single carrier systems because the bandwidth available to each carrier is restricted. However, a large number of symbols is transmitted simultaneously, one on each subcarrier. The number of discrete signal points that may be distinguished on a single carrier is a function of the noise level. Thus, the signal set, or constellation, of each subcarrier is determined based on the noise level within the relevant subcarrier frequency band. The appropriate loading of each carrier is determined during initial training and analysis periods.

Because the symbol time is relatively long and is followed by a guard band, intersymbol interference is a less severe problem than with single carrier, high symbol rate systems. Furthermore, because each carrier has a narrow bandwidth, the channel impulse response is relatively flat across each subcarrier frequency band. The DMT standard for ADSL, ANSI T1.413, specifies 256 subcarriers, each with a 4.3125 kHz bandwidth. Each sub-carrier can be independently modulated from zero to a maximum of 15 bits/sec/Hz. This allows up to 60 kbps per tone. DMT transmission allows modulation and coding techniques to be employed independently for each of the sub-channels.

The sub-channels overlap spectrally, but as a consequence of the orthogonality of the transform, if the distortion in the channel is mild relative to the bandwidth of a sub-channel, the data in each sub-channel can be demodulated with a small amount of interference from the other sub-channels. For high-speed wide-band applications, it is common to use a cyclic-prefix at the beginning, or a periodic extension appended at the end of each symbol to maintain orthogonality. Because of the periodic nature of the FFT, no discontinuity in the time-domain channel is generated between the symbol and the extension. It has been shown that if the channel impulse response is shorter than the length of the periodic extension, sub-channel isolation is achieved.

Proper symbol boundary synchronization is important for optimum performance (i.e. throughput) of DMT modulation. Improper symbol alignment causes performance deterioration through poor equalizer alignment and convergence, thereby increasing intersymbol interference. If the symbol alignment error exceeds the length of equalizer support, training will fail. Thus it is important to maintain proper symbol timing during training as well as during normal operation.

SUMMARY OF THE INVENTION

The method of the present invention provides symbol timing initialization for a multi-carrier receiver. The method uses phase measurements from a plurality of the individual carriers to make an initial determination of the symbol boundary. The method measures the phases of two carriers, preferably the pilot carrier and one adjacent carrier, and, after compensating for phase "distortion" associated with modulation of data onto the carrier and phase distortion imposed on the carriers by the channel, determines the symbol timing based on the phase difference between the two carriers. Because a sampling offset results in a progressive phase offset from bin to bin of a DFT, an examination of the extent of the phase offset between two known symbols yields the sampling offset, and thus the symbol frame index.

BRIEF DESCRIPTION OF THE DRAWINGS

The foregoing and other objects, features and advantages of the present invention will be more readily appreciated

DETAILED DESCRIPTION OF THE PREFERRED EMBODIMENT

Figure 1:
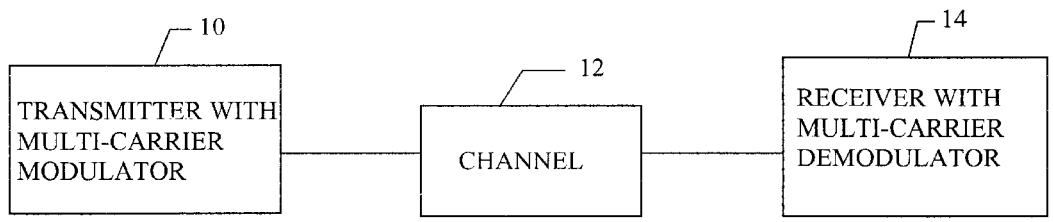
FIG. 1 depicts a block diagram of a communication system utilizing a preferred embodiment of the present invention.

An ADSL communication system is shown in FIG. 1. Transmitter 10 employs a multi-carrier modulator, utilizing Discrete Multi-Tone (DMT) modulation. The DMT modulator may be implemented by mapping the data values to symbols specified by the magnitude and phase of each carrier, and then performing an inverse fast Fourier transform (IFFT). The time domain sequence is then transmitted over channel 12, which includes the effects of the subscriber line twisted pair wire and the analog components and amplifiers of the analog front ends of the ADSL transceivers. The receiver 14 includes a DMT demodulator. The demodulator may be implemented using a FFT transform to recover the magnitude and phase of the symbols on each carrier. It is understood that in a typical ADSL configuration, each end the communication channel utilizes both a transmitter and receiver, making an ADSL transceiver. The downstream transmission direction (from the central office or service provider to the subscriber) utilizes a wider bandwidth than the return direction, or upstream direction. The method described herein below is used to obtain initial symbol frame synchronization for the receiver portions of either ADSL transceivers.

Figure 2:
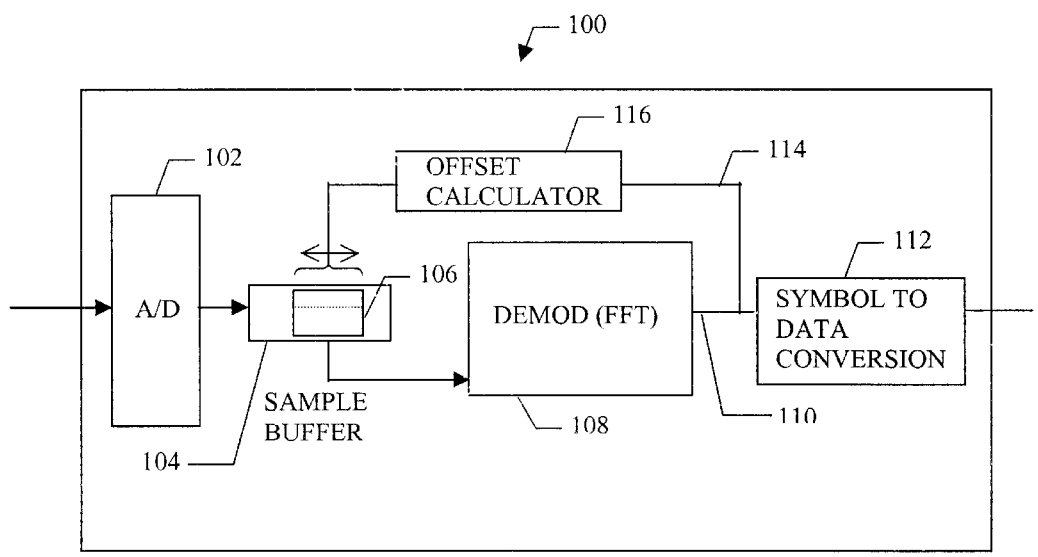
FIG. 2 shows a block diagram of the receiver utilizing a preferred embodiment of the invention.

With reference to FIG. 2, an ADSL receiver 100 is described. Incoming signals are converted to discrete samples by A/D converter 102. The samples are stored for further processing in sample buffer 104. The samples within symbol frame 106 are sent to the demodulator 108. Typically, demodulator 108 converts the frame of samples to the frequency domain via an FFT transform. The symbols are then conveyed via line 110 to convertor 112 for conversion to data values. The symbols are also conveyed via line 114 to the offset calculator 116. Offset calculator 116 adjusts the symbol frame 106 to obtain the correct symbol frame alignment. The operation of offset calculator 116 will now be described.

Standard-compliant ADSL modems transmit a training sequence known to the receiver for all phases of training. The sequence defined by T1.413 for this purpose is a periodic DMT sequence with a period of one DMT symbol. Because the data on each carrier are constant, the training sequence is the sum of N continuous, orthogonal, harmonically related sinusoids. However, because the data symbol used to encode the DMT training symbol is generated from a pseudo-random binary sequence, the initial phase of each carrier is a pseudo-random value from the set $\{\pi/4, 3\pi/4, 5\pi/4, 7\pi/4\}$. These initial phase relationships are known to the receiver.

During start-up the receiver 100 samples incoming signals via A/D 102, but does not know the correct symbol boundary of the received data. A robust and efficient technique to calculate the offset from an arbitrary location in the received DMT symbol train is obtained by examining the phase of two carriers at frequencies $f_1$ and $f_2$ in the training sequence. While any two adjacent carriers may be used, preferably the pilot carrier (at frequency $f_1=f_p=p*f_0$) and the adjacent carrier (at frequency $f_2=f_{p+1}=(p+1)*f_0=f_p+f_0$) are used.

The phase of each carrier is in general affected by three components: the channel, the data or training symbols that are modulated onto the carriers, and the timing offset at the receiver. The training sequence specifies the initial phase of each carrier and is typically generated by a generator polynomial. At the receiver, this phase component relating to the modulation is removed by the receiver based on a priori knowledge of the training sequence. The measured phase of the first carrier $\phi_1$ (preferably the pilot carrier) is corrected by subtracting the expected phase $\phi_{data1}$ from what was actually measured (or calculated via FFT). This is represented as $(\phi_1-\phi_{data1})=\phi_{offset1}$. The measured phase $\phi_2$ of the second carrier is similarly adjusted based on the expected phase of the second carrier as determined by the training sequence, and is represented by $(\phi_2-\phi_{data2})=\phi_{offset2}$. The phase difference between the two carriers after compensating for the effects of data modulation may thus be represented as $\phi_{offset1}-\phi_{offset2}=\Delta\phi_{offset}$. Alternatively, the data phase offset contribution may be set to a predetermined value in terms of sample offset and used to modify the final sample offset calculation, as opposed to modifying the phase measurements directly. This is possible because the training sequence is predetermined for any two predetermined carriers.

The channel phase component is determined empirically based on the frequency of the carriers to be used. The phase response of the channel and associated analog hardware is such that the phase difference between the frequencies $f_1$ and $f_2$ due to the channel is nearly constant over a wide variety of channels. This has been found by the inventor to be empirically true for the channels of interest. Thus the channel component of the phase offset is set to a constant value. Note that two constants may be used: one for upstream communication from the subscriber to the central office, and a second constant to be used for the downstream communication from the central office to the subscriber. This is because the respective pilots are placed in a different portion of the spectrum for the upstream and downstream channels.

The channel phase contribution may be subtracted from the calculated values $\phi_{offset1}$ and $\phi_{offset2}$ (or their difference $\Delta\phi_{offset}$). Preferably, however, and in similar fashion to the data phase offset, the channel phase offset contribution may be set to a predetermined value in terms of sample offset and used to modify the final sample offset calculation, as opposed to modifying the phase measurements directly. The value of the channel phase offset in units of samples is represented as $k_c$ and is calculated by the expression $k_c=\Delta\phi_{channel}(N/2\pi)$, where $\Delta\phi_{channel}$ is the phase difference between two adjacent carriers due to the channel phase response.

Alternatively, the phase offset due to the channel may be estimated by, for example, varying the assumed channel phase offset $k_c$ and examining the equalizer convergence during the training period of a time domain adaptive equalizer. The channel phase offset $k_c$ that minimizes the equalizer error should be selected.

The remaining phase component is due to the timing offset, that is, it results from the offset in the sampling instant and the symbol frame at the receiver. The method described herein is intended to determine the sampling offset to within one sample time so as to achieve overall symbol synchronization. Further timing correction to modify the precise sampling instant may be performed using other methods associated with timing recovery based on, e.g., a phase-locked loop referenced to the pilot carrier.

Since the two sinusoids differ in the frequency of the fundamental carrier, carrier $f_{p+1}$ contains exactly one more sinusoidal period than $f_p$. The phase difference due to the sampling offset between these two carriers varies linearly between 0 and $2\pi$ radians in direct proportion to the timing offset displacement expressed in the number of samples, i.e, from 0 to one symbol length, N, where N is the number of samples in the symbol. Non-adjacent carriers may be used.

Expressing the timing offset in terms of the data-compensated phase measurements ($\phi_{offset1} - \phi_{offset2} = \Delta\phi_{offset}$), the phase difference due to the channel and hardware phase response as $k_c$ (in units of samples), the expression for the offset estimate $\delta$ (in units of samples) follows as $$\delta = \Delta\phi_{offset}\left(\frac{N}{2\pi}\right) - k_c,$$

where $\Delta\phi_{offset}$ represents the inter-carrier phase difference after compensation for the effects of modulation. The precision of this technique with the associated assumptions give an offset estimate accurate to within one sample of its optimum value.

Figure 3:
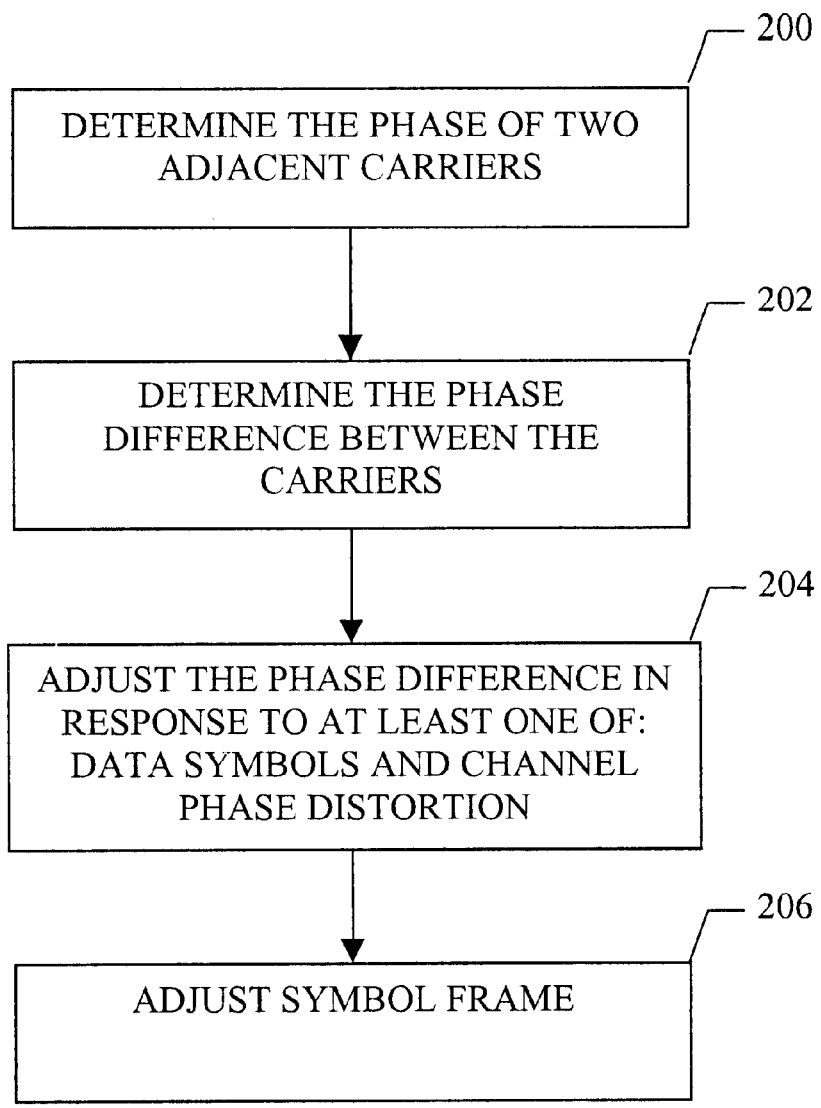
FIG. 3 shows a flow chart for a preferred embodiment of the invention.

With reference to FIG. 3. the method of obtaining symbol synchronization is described. The phase of two adjacent carriers is determined in step 200. Preferably the pilot carrier and an adjacent carrier is measured. This is preferably done by examining the output of FFT transformer within demodulator 108. The FFT output provides the magnitude and phase of each carrier. In the downstream direction the pilot carrier corresponds to the $64^{th}$ frequency bin, and in the upstream direction the pilot carrier corresponds to the $16^{th}$ bin. Of course a subset of the FFT points may be calculated to provide only the points of interest if the other symbols are not required for further processing. In step 202, the phase difference between the two adjacent carriers is calculated. In step 204, the phase difference is compensated to account for phase components associated with the data symbols that were modulated onto the carrier and phase distortion associated with the channel. To account for the data modulation, for example, the phase of the pilots may be initially set to $\pi/4$ for the duration of the training period. The calculated value of the pilot symbol may then be counter-rotated by a complex multiplication with the conjugate of the expected value, thereby eliminating the effect of the $\pi/4$ offset. The second carrier is similarly counter-rotated based on the pre-determined training sequence. Similarly the channel compensation may be performed by counter-rotating the received symbols. phase distortion associated with the channel. To account for the data modulation, for example, the phase of the pilots may be initially set to $\pi/4$ for the duration of the training period. The calculated value of the pilot symbol may then be counter-rotated by performing a complex multiply by the conjugate of the expected value, thereby eliminating the effect of the $\pi/4$ offset. The second carrier is similarly counter-rotated based on the pre-determined training sequence. Similarly the channel compensation may be performed by counter-rotating the received symbols.

It is important to note that phase differences between a measured value and a predetermined value may be obtained by a counter-rotation of the measured value by the conjugate of the constant value followed by an arctangent function, or by an arctangent function applied to the measured value followed by a subtraction of the phase of the predetermined value. As a result, the compensation for the data modulation or the channel phase distortion may be performed by either technique, in either order. Both the data modulation and the channel distortion are predetermined values. Thus the order of the phase adjustment step 204 may be interchanged with the phase difference calculation step 202. The arctangent function is preferably performed using an approximation algorithm based on Chebyshev polynomials.

Finally, in step 206, the symbol frame 106 is adjusted to supply the properly framed symbol to the demodulator 108. This is typically done by adjustingthe symbol frame pointer within the sample buffer. The symbol frame pointer is the memory location corresponding to the beginning of the frame within sample buffer 104. The method of the present invention may also be understood in relation to the code section set forth below.

```
%***************************************************************
%              MATLAB code fragement illustrating carrier phase derived symbol
%              boundary synchronization for DMT ADSL. This algorithm is executed
%              prior to time domain equalizer training. The implementation
%              presented here is for the T1.413 ADSL downstream channel, but
%              can be generalized for any DMT signal/system format.
%
%   Inputs: channel_output(n) - time domain DMT ADSL signal received from AFE, with
%                  each symbol containing 512 samples
%           input_symbol(512) - frequency domain DMT ADSL local reference signal
%
%   Output: computed_offset - integer offset giving the first sample in the
%                  DMT ADSL symbol relative to the initial position
%
%   Clear initial value of the delay estimate
computed_offset = 0;
%
%   Average NUM_SYNC_SYMBOLS estimates to reduce the noise sensitivity
NUM_SYNC_SYMBOLS = 16;
%
%   Constant to account for constant phase difference between carrier p and p+1
DELAY_ADJUSTMENT = 6;
%
%   Average several offset estimates
for symbol_counter=1:NUM_SYNC_SYMBOLS
%
```

```
%   FFT demodulation of 1-symbol periodic training sequence
    current_symbol =
fft(channel_output(1+512+symbol_counter*512:512+512+symbol_counter*512));
%
%   Pilot carrier p = carrier #65, counter rotate data phase
    current_symbol (65) = current_symbol(65)*conj(input_symbol(65));
%
%   Adjacent carrier p+1 = carrier #66, counter rotate data phase
    current_symbol (66) = current_symbol(66)*conj(input_symbol(66));
%
%   Calculate the phase difference between p and p+1
    delta_phase = angle(current_symbol(66)*conj(current_symbol(65)));
%
%   Cyclic arithmetic, constrain 0<=delta_phase<2*pi
    if delta_phase<0
      delta_phase = delta_phase+2*pi;
    end
%
%   Accumulate estimate
    computed_offset = computed_offset+(delta_phase*512/(2*pi));
end
%
%   Average estimate
computed_offset = computed_offset/NUM_SYNC_SYMBOLS;
%
%   We need an integer offset estimate so round it
computed_offset = round(computed_offset – DELAY_ADJUSTMENT);
%
%   Start receiver processing using channel_output (n-computed_offset)
```

Preferred embodiments of the present invention have been described herein. It is to be understood, of course, that changes and modifications may be made in the embodiment without departing from the true scope of the present invention, as defined by the appended claims.

I claim:

1. An apparatus for obtaining symbol synchronization within a multi-carrier receiver comprising:
   a sample buffer for storing samples of a received signal, said sample buffer having a symbol frame pointer;
   a multicarrier demodulator connected to said sample buffer for determining the phase of each of a plurality of carriers from said samples; and
   an offset calculator connected to said multi-carrier demodulator to determine a phase difference between any two adjacent carriers within said plurality of carriers;
   wherein said symbol frame pointer is adjusted in response to said offset calculator.

2. The apparatus of claim 1 wherein said multicarrier demodulator includes an FFT module.

3. The apparatus of claim 1 wherein said offset calculator compensates for at least one of: channel phase distortion and data modulation.

4. The apparatus of claim 1 wherein said multicarrier demodulator conforms to ANSI specification T1.413.

5. The apparatus of claim 1 wherein one of said two adjacent carriers includes a pilot carrier.

6. The apparatus of claim 1 wherein said offset calculator performs modulation compensation by counter-rotation multiplication.

7. The apparatus of claim 1 wherein said offset calculator performs modulation compensation by subtracting a constant sample offset.

8. The apparatus of claim 1 wherein said offset calculator performs channel phase compensation by counter-rotation multiplication.

9. The apparatus of claim 1 wherein said offset calculator performs channel phase compensation by subtracting a constant sample offset.

* * * * *